Dec. 30, 1952 H. L. McWHORTER 2,623,461
MAGAZINE PRESS INK FOUNTAIN
Filed July 22, 1947 4 Sheets-Sheet 1

Fig.1

INVENTOR
Henry L. McWhorter
By Carlson, Pitzner, Hubbard & Wolfe
ATTORNEYS

Patented Dec. 30, 1952

2,623,461

UNITED STATES PATENT OFFICE 2,623,461

MAGAZINE PRESS INK FOUNTAIN

Henry L. McWhorter, Chicago, Ill., assignor to The Goss Printing Press Company, Chicago, Ill., a corporation of Illinois Application July 22, 1947, Serial No. 762,580

13 Claims. (Cl. 101—351)

The present invention relates to printing presses and more particularly to a printing press ink fountain for feeding magazine type inks.

In the printing of high-grade magazines it has been customary to use special presses which are considerably more complex than those used for newspaper work. This is due in large measure to the difficulties inherent in the inks which must be employed. In the first place magazine inks, particularly in the lighter colors, are much thicker than newspaper ink, yellow ink, which is the most viscous, being putty-like in consistency. In an attempt to distribute such thick ink in an even film it has been necessary to resort to ink fountains especially adapted for the feeding of thick ink and the use of large numbers of ink rollers. In addition, all magazine inks are not of the same putty-like consistency, the dark blue and black inks being almost as thin as the inks used for printing newspapers. Thus, undershot fountain arrangements which are satisfactory for thick inks frequently result in the leakage of the thinner inks which must be fed from the same fountain. Conversely, design of overshot fountains suitable for the thinner inks gives rise to problems such as the uneven feeding of the thicker inks at the fountain blade. As a result it has been considered virtually impossible to design an ink feeding arrangement which provides optimum feed control for a wide variety of inks without leaking.

The problem has been further complicated by the fact that magazine inks, which must be used with glossy, non-absorbent paper, are of the volatile drying type, consisting primarily of a pigment and a pigment-carrying binder dissolved in a solvent of fixed boiling point. The boiling point, in other words, the temperature at which rapid evaporation of the solvent takes place, is normally chosen sufficiently high so that substantial drying does not occur until such time as the printed web enters the drier, otherwise the ink transferring rollers and printing plates would soon become coated with sticky or dried ink requiring a complete shutdown of the press. In magazine presses employing conventional inking arrangements, a solvent must be used having a boiling point in the range of about 400–600° F. As a result, high capacity heaters must be used which ordinarily operate at temperatures which are so high as to scorch the paper, particularly at the slow press speeds met in starting and stopping. Even more important, the use of such high boiling point solvents greatly limits the maximum speed at which magazine presses may be operated. The heaters, in addition, are an expensive investment, are costly to operate and require frequent maintenance.

Conventional types of ink fountains are also very difficult to clean. A cloth will not satisfactorily remove the stiff ink from the notch between the fountain roller and the blade, and the use of pointed objects to remove this ink entails the danger of scratching the fountain roller or nicking the fountain blade which seriously interfers with proper subsequent control of the ink flow. Also, ink mist and paper lint gather on the outer edge of the ink blade and harden there, disturbing the adjustment of the ink feed. Removal of such deposit, in the case of conventional feeding devices, requires the fountain to be disassembled.

Still another difficulty is encountered in the usual types of magazine presses as a result of shutdown, which gives the volatile ink a chance to dry on the ink transferring and distributing rollers. It is found that considerable paper must be wasted upon restarting of the press before an evenly distributed ink film is established.

With the foregoing in mind, it is an object of my invention to provide an improved ink fountain which will effect uniform feeding of both the thickest inks and the thinnest inks employed in the printing of magazines. It is an allied object to provide an ink fountain for the feeding of thick ink but in which thin ink may be also employed in an adjacent section thereof without the slightest danger of leakage.

It is a further object to provide an ink fountain which feeds ink so uniformly that a minimum of mechanical working is required, permitting the use of abbreviated distribution arrangements and enabling the use of low boiling point solvents in the ink.

It is another object to provide an improved ink fountain which may be easily and quickly cleaned without changing the blade adjustment and without danger of damaging the fountain blade or fountain roller.

It is still another object to provide an ink fountain for use with volatile inks in which a fresh even film of ink is immediately established upon starting the printing operation. It is a more detailed object to provide an improved ink fountain which includes means for causing initial indexed advancement of the fountain roller substantially simultaneously with the completion of the film-forming path and as an incident to restarting of the press.

It is a further object of the invention to provide an ink fountain which is more economical to maintain, in which operating expenses in time and wastage of paper are kept to a minimum, and which facilitates the construction of a compact and low cost printing press.

Other objects and advantages of the invention will be apparent from the following detailed description taken in connection with the accompanying drawings, in which.

While the invention is susceptible of various modifications and alternative constructions and uses, I have shown in the drawings and will herein describe in detail only the preferred embodiments of the invention. It is to be understood, however, that I do not intend to limit the invention by such disclosure, but aim to cover all modifications and alternative constructions and uses falling within the spirit and scope of the invention as expressed in the appended claims.

Figure 1:
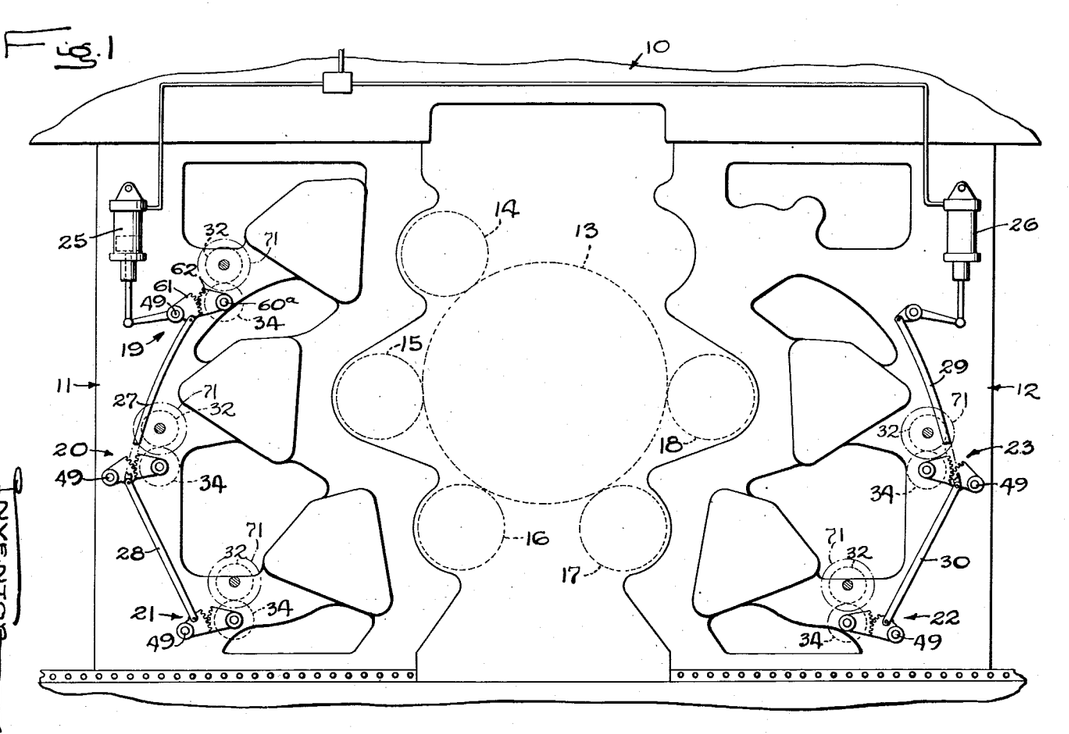
Figure 1 is a general view in elevation of a magazine press employing the present invention and in which a plurality of ink fountains are controlled by a single actuator.

Referring now to Figure 1, there is shown one section of a magazine press 10 having ink carriages 11 and 12. Centered between them is an impression cylinder 13 which is engaged by five plate cylinders 14–18. Associated with each of the plate cylinders is an inking mechanism, such mechanisms being generally designated in the present instance by the numerals 19–23. To control the inking mechanisms, the ink carriages are provided with control actuators 25, 26 respectively which may, for example, take the form of hydraulic cylinders and pistons which are in turn coupled to the respective sets of inking mechanisms by means of links 27, 28 and 29, 30.

In conventional undershot fountains, a film of ink is formed on the fountain roller and passed to the first steel roller by means of a ductor roller which is transported back and forth between the fountain roller and the steel roller once every three or four revolutions of the plate cylinder. A relatively large number of steel and rubber rollers must be used to act as an ink reservoir and to smooth out the ink film prior to its application to the plate cylinders. While efforts have been made to produce a more uniform flow of ink from the fountain to the plate cylinders of a magazine press, continuous feed fountain arrangements, particularly of the undershot type, have been avoided because of leakage and other difficulties. In accordance with the present invention a continuous feed inking arrangement is provided for a magazine press using volatile inks in which the difficulties ordinarily associated with continuous feeding are effectively overcome and in which numerous ancillary advantages are obtained.

Figure 2:
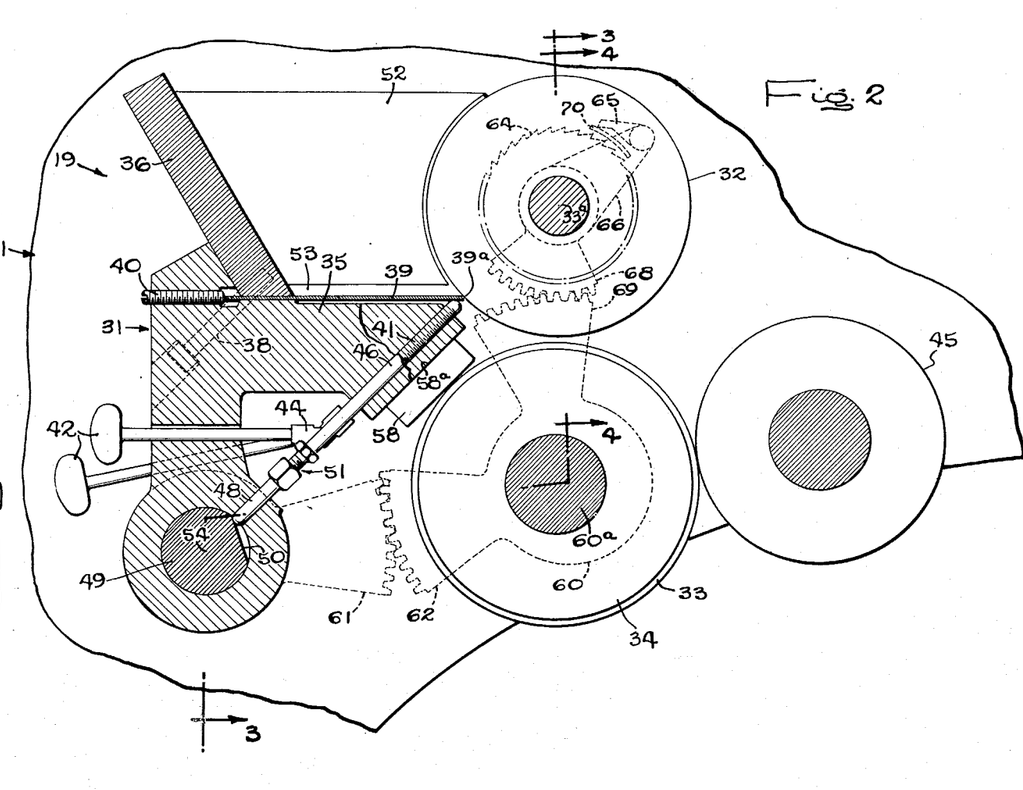
Fig. 2 is a fragmentary detailed view in partial section showing one of the inking mechanisms used in the press of Figure 1.

Referring now to the detailed showing of the improved inking arrangement in Fig. 2, and which is representative of one of the five devices 19–23 included in the press of Figure 1, it will be first observed that the mechanism includes three major elements: a blade supporting assembly 31, a fountain roller 32, and a transfer roller 34. The blade supporting assembly 31 includes a subframe 35 of cast iron or the like having mounted thereon an ink retaining wall 36 to form an ink trough. The wall 36 may be clamped in place on the subframe 35 by any convenient means, for example, by one or more bolts 38 which are recessed and angled upwardly therein. In the present instance the same bolts 38 are utilized to clamp a flexible fountain blade 39 which extends horizontally along the lower portion of the ink trough presenting its edge 39a to the fountain roller 32. The opposite or left hand edge of the fountain blade 39 is retained between the lower portion of the wall 36 and the body of the frame 35. Horizontal initial adjustment of the fountain blade 39 may be effected if desired by one or more horizontal adjusting screws 40, the adjustment being maintained by subsequent tightening of the fastening bolts 38.

Since the adjusting screws 40 provide only approximate adjustment and since a much finer and more exact control of the ink film is required from point to point along the fountain roller 32, a plurality of adjusting screws 41 are used which are advanced into abutting engagement with the edge portion of the blade 39 by means of a thread of fine pitch. Rotation of the screws 41 is effected by means of externally available keys 42 coupled through universal joints 44.

Figure 7:
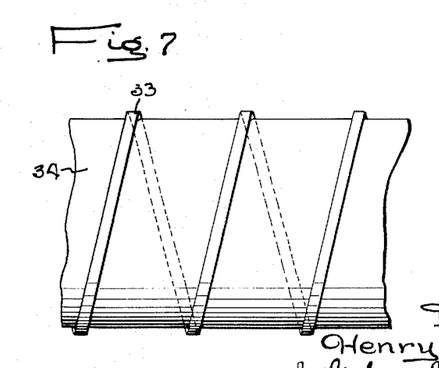
Fig. 7 shows a portion of the transfer roller and in particular the raised helical surface which may be used thereon.

With the fountain blade 39 properly adjusted into a closely spaced relation with the fountain roller 32, and upon rotation of the fountain roller at a relatively low peripheral speed, for example, one one-hundredth of the press speed, a film of ink is formed on the fountain roller and is carried counterclockwise into contact with the transfer roller 34. The latter has a raised helical ridge or "spiral" 33 thereon, which, as shown in Fig. 7, occupies only a fraction of the surface area. The transfer roller 34 preferably rotates with a peripheral speed which corresponds to that of the press so that wiping engagement occurs between the fountain roller 32 and the transfer roller 34. The layer of ink thus formed on the roller 34 is subsequently passed to a rubber roller 45 and thence to a succession of steel and rubber rollers leading to the plate cylinder 14.

In accordance with one aspect of the invention means are provided on the blade supporting assembly 31 for clamping the fountain blade 39 into intimate contact with the fountain roller 32 under standby conditions. In the present instance this is accomplished by a series of clamping pins 46 (Fig. 3) which are axially slidable in the subframe 35. In order that all of the pins 46 may be simultaneously urged into pressing engagement with the fountain blade 39, a longitudinal cam is used which contacts the lower ends 48 of the pins 46. In the present instance the cam is formed on a control shaft 49 by reason of a flat 50 machined thereon. It will be apparent that as the control shaft 49 is rotated, for example in a clockwise direction, each of the pins 46 will ride from the flat 50 to a position on the periphery of the shaft. The pressure existing at the blade 39 with the pins 46 in their clamped or fully advanced position may be readily determined by adjustment of a threaded telescoping joint 51 in each of them.

Since the transfer roller does not contact the fountain roller but is spaced from it so as to wipe off the ink, it is necessary to employ an ink film which is considerably thicker than would, for example, be used for a ductor roller. Thus the keys 42 are normally adjusted so that the gap existing between the blades 39 and the fountain roller 32 under running conditions is about 0.008 inch along the entire length thereof. While such gap may not be sufficiently wide to produce leakage of the lighter colored inks which are of putty-like consistency, it has been found that leakage of the darker magazine inks, which are relatively thin, is exceedingly objectionable. By using the structure shown, however, it has been found that the clamping pressure afforded by the pins 46 upon stopping the press prevents leakage of even the thinnest inks. It might be expected that movement of the fountain blade as much as 0.008 inch would cause leakage between the blade and the fountain dividers or end plates, one of which has been designated 52 and shown in Figs. 2 and 3. I have found, however, that the latter may be readily avoided by providing the divider 52 with a flexible rubber sealing strip 53 which follows the blade 39 in its upward and downward deflection.

In accordance with one of the features of the present invention, the blade supporting assembly 31 is mounted for bodily rotation about an axis which is not only parallel to the axis 33a of the fountain roller 32 but which lies substantially in the plane defined by the fountain roller axis and the edge 39a of the fountain blade which cooperates with it. As shown in Fig. 2 this axis of bodily rotation is designated 54. Thus the edge 39a of the blade lies approximately on a line connecting the two axes 33a, 54, and it is possible to swing the blade supporting assembly counterclockwise without jamming the blade 39 against the surface of the fountain roller 32. It is to be particularly noted that such swinging may take place even through the blade is in the fully clamped condition, making the pivoting arrangement a particularly useful part of the overall combination. Further, the geometrical layout shown in Fig. 2 is such that the angular positioning of the assembly 31, as the latter is swung into place, has a minimum effect on blade adjustment. In the preferred embodiment of the invention shown in Fig. 2, the distance between the blade edge 39a of the axis 54 about which the blade is pivotally supported is made short enough for the edge 39a to pass through a plane defined by the roller axis 33a and the pivot axis 54 of the fountain roller. It is highly advantageous that this distance be no greater than the shortest distance from the pivotal axis 54 to the surface of the fountain roller. The incorporation of these advantageous dimensions in the preferred form of the invention (Fig. 2) inherently leads to the positioning of the fountain blade edge 39a approximately in the plane defined by the axes 33a and 54 when the blade is in inking position. It will be seen from an inspection of Fig. 2 that whenever the edge 39a is displaced from the inking position one distance unit along a circular path about axis 54, the change in radial distance between the edge 39a and the surface of the fountain roll is equal to only a small fraction of the same distance unit. Therefore, any reasonable inaccuracy in the positioning of the ink trough will cause only an inconsequential variation in the distance between the edge 39a and the fountain roll. A further advantage from having the normal inking position of the blade edge 39a approximately in the plane defined by the axes 33a and 54 is that for a given tolerance in the error permitted in the distance between the edge 39a and the fountain roll, the edge 39a may be displaced a much greater distance to the left about the axis 54 until the tolerance limit is reached. Also it can be displaced to the right a distance equal to the permitted displacement to the left and still maintain the edge 39a within the close tolerance relative to the fountain roll surface essential to maximum efficiency. Thus, the total range in a circular path about axis 54 within which the edge 39a may be positioned is twice the permitted displacement of the edge 39a in either direction from the point of zero tolerance. The invention in certain of its aspects is not limited to exact alinement of the points 33a, 39a, 54 but would also include structures in which the pivot axis 54 of the assembly 31 is displaced laterally a slight amount from the position illustrated. Thus, location of the axis 54 somewhat to the right would not prevent outward swinging of the assembly.

Swinging of the assembly 31 away from the fountain roller 32 enables the fountain to be cleaned in a very short time without the necessity of disassembling or even changing the blade adjustment. Another advantage is that it is totally unnecessary to use sharp objects to clean the crevice or groove formed by the fountain blade and the fountain roller, with the result that a possible damage to these accurately machined surfaces is obviated.

In accordance with a more detailed aspect of the invention, the axis of bodily rotation of the blade supporting assembly 31 is caused to coincide with the axis of the control shaft 49. This is more clearly brought out in Fig. 3 which shows the control shaft 49 centrally mounted within a supporting sleeve or hollow trunnion 35a which is preferably formed integral with the subframe 35. The cylindrical outer surface of the sleeve 35a is, in turn, journaled in a frame member 56 of the ink carriage 11. The effect of this coaxial relationship is to cause the lower ends 48 of the clamping pins to ride on a surface of constant radius as the blade supporting assembly 31 is rotated through a considerable angle for cleaning purposes. In other words, the relationship enables the positioning of the clamping pins 46 to be substantially unaffected by rotation of the blade supporting assembly 31 through its range of angular movement.

Figures 3, 4:
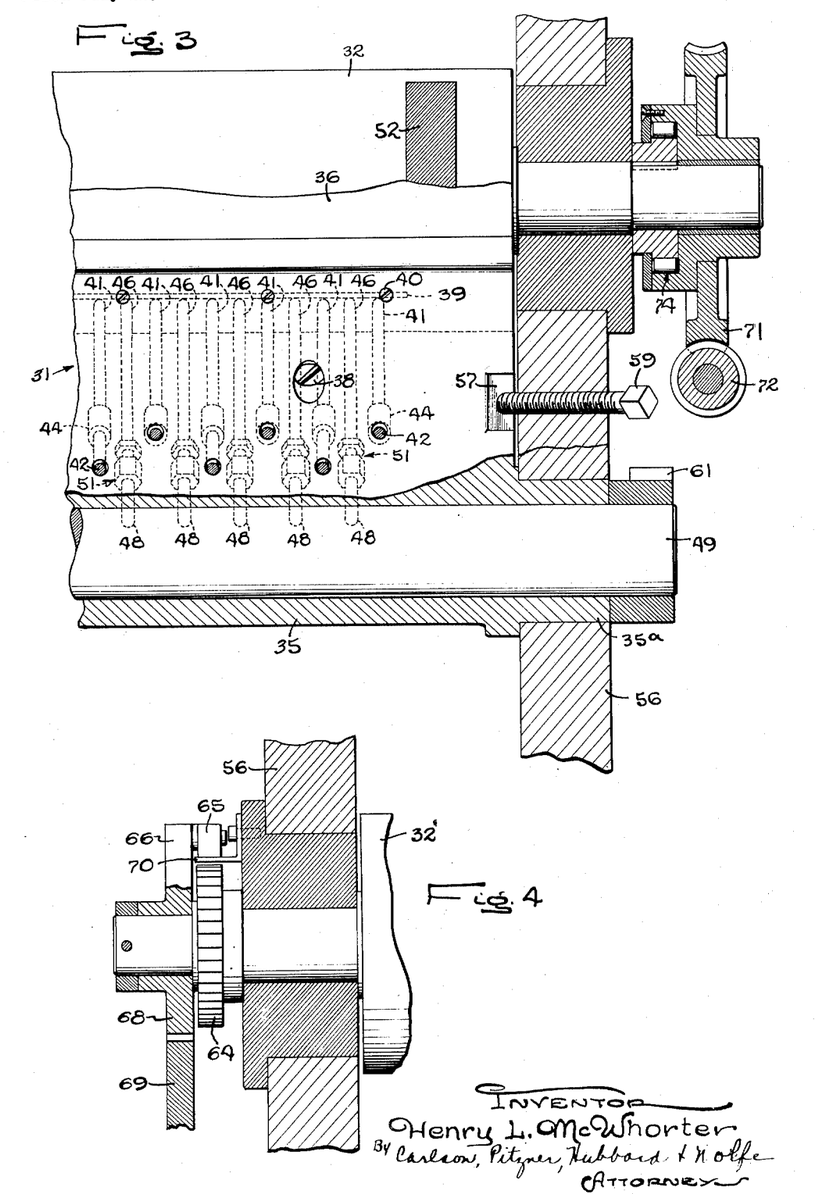
Fig. 3 is a view of the inking mechanism of Fig. 2 and taken along the line 3—3 therein, the right hand portion only of the mechanism being shown.
Fig. 4 is a detailed fragmentary view of the ratchet arrangement and taken along the line 4—4 of Fig. 2.

Since it is desirable for the blade supporting assembly 31 to be accurately located when the fountain is in its normal operating condition, lugs or stops 58 having a machined surface 58a thereon may be provided on the frame 56. To hold the supporting assembly 31 in such operating position, clamping bolts 59 are employed which may be threaded into the frame 56 and angled toward a correspondingly oriented flat or land 57.

The present invention is also concerned with disengagement of the transfer roller 34 as an incident to clamping of the fountain blade 39. It is advantageous to have these rollers separated when the ink feeder is stopped. Sometimes the press is turned over several times while the feeder is off for cleaning and other purposes. If the transfer roller remains in ink transferring relation to the fountain roller, ink will be deposited on the rollers where it will dry and become a nuisance. This disengagement has been here accomplished by an adjustable mounting which causes coordinated bodily advancement and backing away of the roller as the control shaft 49 is rotated. Specifically, it will be noted in Fig. 2 that the shaft 60a of the transfer roller is mounted for rotation in an eccentric sleeve 60, the outer cylindrical surface of which is journaled in the ink carriage frame 56. In order to open up a gap between the fountain roller 32 and the transfer roller 34, the eccentric sleeve 60 is caused to rotate in a counterclockwise direction and into the position illustrated. In the present instance such rotation is produced by a gear segment 61 which is connected to the end of the control shaft 49 (Fig. 3) and a second gear segment 62 which is in mesh therewith and forms an integral part of the eccentric sleeve 60. For more positive coupling, segments 61, 62 are duplicated on each side of the magazine carriage frame.

To summarize the operation of the structure thus far disclosed:

It will be apparent that operation of the hydraulic actuator 25 upon stopping of the press will be effective to produce clockwise rotation of the control shaft 49 and counterclockwise rotation of the sleeve 60 associated with the gear segment 62, lowering the transfer roller into the position shown. Near the end of such movement the clamping pins 46 will be advanced into full engagement with the fountain blade 39 to shut off the ink flow. Since the ends 48 of the clamping pin have not quite reached the periphery of the shaft 49, the device as shown in Fig. 2 can be said to be in the "almost off" position. Conversely, when the actuator 25 is moved to the opposite position as an incident to restarting the press, the clamping pins 46 are caused to move downwardly onto the flat 50 of the control shaft 49 into a released position while the sleeve 60 is rotated clockwise raising the transfer roller 34 into contact with the fountain roller.

Further in accordance with my invention, release of the fountain blade 39 and approach of the rollers 32, 34 on starting is accompanied by rotational advancement or indexing of the fountain roller to bring into action a freshly formed ink film thereon. This is very advantageous because the freshly formed film has not lost any solvent due to evaporation while the press is idle. In the particular device illustrated, advancement or indexing of the fountain roller is accomplished by means of a ratchet wheel 64 which is engaged by a pawl 65 mounted on a pawl arm 66. The latter is advanced in a counterclockwise direction upon starting by means of a gear segment 68 which is in mesh with a gear segment 69 coupled to the eccentric sleeve 60. It will be apparent, then, that as the control shaft 49 rotates in a counterclockwise direction as an incident to restarting the press, the pawl 65 will serve to drive the fountain roller in a counterclockwise direction. It is apparent from Fig. 2 that the fountain blade and the transfer roller are located at spaced points about the periphery of the fountain roller. The ratio between the gear segment 68 and the gear segment 69 is so chosen so as to bring a fresh film of ink from the edge 39a of the fountain blade to the area of wiping contact between the fountain roller 32 and the transfer roller 34. In the specific design illustrated the gear segment 68 moves through an angle of 48° while the cooperating segment 69 moves through an angle of approximately 25°.

In the present invention provision is made for insuring release of the fountain blade 39 from the fountain roller 32 prior to advancement of the latter. Although this may be accomplished in various ways, I prefer to use a lost motion connection in the fountain roller drive. As here carried out the ratchet is provided with a ratchet masking plate 70 which prevents the pawl 65 from engaging the ratchet 64 until after the control shaft 49 moves through a sufficient distance to release the clamping pins 46. Thus it will be noted in Fig. 2 that while the pawl 65 has moved counterclockwise almost to the left hand edge of the ratchet masking plate, the clamping pins 46 have already begun to descend on the flat 50 with a consequent release of clamping pressure. The release of the fountain blade clamps prior to advancement of the fountain roller in the manner just described not only makes it possible to move the fountain roller with a very small amount of torque but prevents damage or wear which might otherwise occur at the tip 39a of the blade.

As previously stated the fountain roller 32 normally operates at a peripheral speed which is a small fraction of the peripheral speed of the remaining rollers in the press. The manner in which such reduced speed is accomplished will be apparent from inspection of Fig. 3 which shows a worm gear 71 driven through a worm 72 which is powered from the ink carriage press drive. Associated with the reduction gearing is an overrunning clutch 74 which may for example be of the ratchet type and which enables the fountain roller 32 to be advanced by the pawl 65 without the necessity of using any other releasing mechanism.

One of the primary advantages of the fountain roller indexing device will become apparent upon reviewing conditions which exist at the time the press is restarted. As previously noted, volatile ink is normally used which tends to dry on the fountain roller when the latter comes to a stop; however, due to the rapid initial advancement of the fountain roller, a fresh ink film is immediately available to be passed in succession to the remaining rollers in the press and wastage of paper reduced to a minimum. If, on the other hand, such indexing were not employed, approximately 150 inches or more of the web would be lost prior to the time that the slow moving fountain roller would start to supply ink to the transfer roller. This saving in paper is particularly important where frequent stopping and starting is necessary.

The arrangement outlined above makes it possible as a practical matter to employ continuous feeding of ink with a fountain of the undershot type, enabling the advantages inherent in undershot fountains to be more fully utilized. For example, the ink within the ink trough is constantly circulated and even the heaviest inks may be fed in an even film without "wedging" of the ink against the blade. In addition, the automatic cutoff features of the device as an incident to the shutting down of the press enable a gap to be used between the fountain blade and the fountain roller which may be as great as 0.008 inch in thickness. The advantage of this will be apparent when it is considered that leakage is a problem even in conventional fountains which employ gaps on the order of 0.001 inch.

One benefit of great practical importance derived from the use of the disclosed construction is the fact that no ductor roller need be used. Avoidance of the ductor roller has enabled the evaporation of the ink normally encountered to be considerably reduced, the reason for such reduction being two-fold. In the first place, my observations have indicated that a ductor roller causes excessive mechanical working of the ink resulting in ink mist and adding heat to the ink to a degree where aggravated evaporation of the solvent is produced. This effect may be more fully appreciated when it is considered that in a conventional ductor inking arrangement the ductor roller comes up to full press speed when it is against the press inking rollers and almost stops, or even reverses direction, when it comes back against the fountain roller. This change in speed must be brought about by the surface friction of the ductor roller against the rollers that it contacts, and the kinetic energy of the rapidly rotating ductor roller must be absorbed by friction against the fountain roller. This energy is immediately turned into heat which is effective to evaporate the ink solvent. The same thing takes place when the practically stationary ductor roller contacts the rapidly revolving inking rollers, the frictional energy while accelerating for the most part evidencing itself as an increase in the evaporation of the ink solvent.

An additional advantage of using the continuous feed system disclosed is that the number of rollers required for transferring the ink film to the plate cylinder may be considerably reduced. While I prefer to use a total of fifteen steel and rubber rollers between the transfer roller and the plate cylinder, it is possible to use considerably fewer rollers, in contrast to the eighteen or more rollers ordinarily required in a magazine press. This is due in large measure to the fact that less reservoir capacity is necessary to provide a smooth film at the form rollers. Since there are fewer ink rollers, there is a consequent reduction in the area over which evaporation of the ink may take place and also less frictional heat to be dissipated in evaporation. As a result of the foregoing, it has been found that the disclosed inking mechanism will permit the use of an ink having a solvent with a boiling point of approximately 200° F. without danger that the ink will dry on the rollers or printing plates. This permits smaller and less expensive heaters to be used which obviate scorching at even the lowest press speeds, and enables the output of the press to be stepped up from approximately 7,000 copies per hour to possibly double or even triple this value. It is to be borne in mind that such greatly increased output is not obtained by using an inking mechanism which is complicated or expensive. On the contrary, the disclosed construction has been found to be considerably less expensive than conventional arrangements, smaller in size, and more easily adjusted and operated.

*Actuation of control shafts by relatively movable parts of the press*

In the preceding section it has been shown that the movement of the control shafts 49 may be effected by a hydraulic piston and cylinder 25 or any other analogous type of power source which is put into operation as an incident to the shutting down and starting up of the press. As a result of testing and development it has been found feasible to actuate the control shaft as a direct result of relative movement of various press elements. One such arrangement is disclosed in Fig. 5 which shows in more or less schematic form an ink fountain and series of inking rollers included on one of the movable ink carriages. The roller arrangement is covered in greater detail in my copending application for Letters Patent Ser. No. 6,734, filed February 6, 1948, a joint application with Curtis S. Craft, now abandoned.

Figure 5:
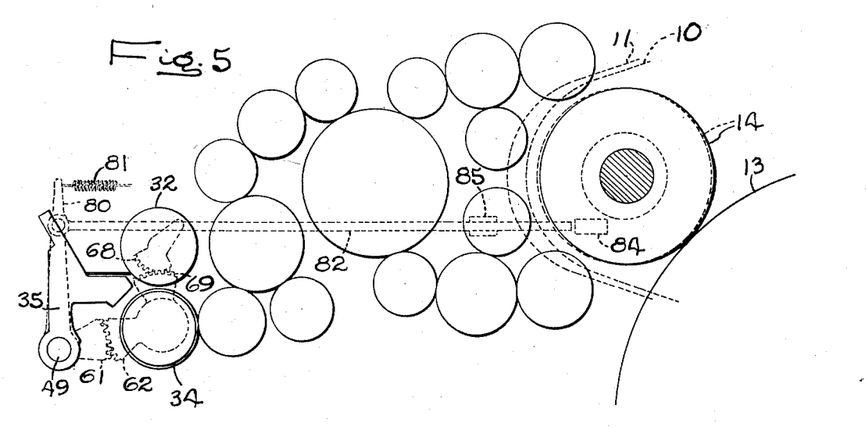
Fig. 5 shows an alternative manner in which the inking mechanism control device may be actuated.

It will be noted that the control shaft 49 has connected to it a lever 80 which is normally urged in a clockwise direction by a spring 81. Pivoted to the lever 80 is a horizontal push rod 82 which extends into engagement with a lug or other abutment 84 located on the stationary main frame of the press. If desired, the push rod 82 may be supported by one or more guides 85 located on the frame of the ink carriage.

As the ink carriage is advanced into its operating position, in which all the rollers are in ink-transferring contact, the push rod 82 strikes the abutment 84 rotating the lever 80 in a counterclockwise direction. As has been previously observed in connection with Fig. 2, rotation of the control shaft in a counterclockwise direction causes a release of the fountain blade 39, indexed advancement of the fountain roller 32, and engagement of the transfer roller with the fountain roller. Conversely, retraction of the inking carriage upon shutting down of the press causes the push rod 82 to move to the right under the influence of the spring 81 causing clockwise rotation of the control shaft 49 and a cessation of the ink flow.

Figure 6:
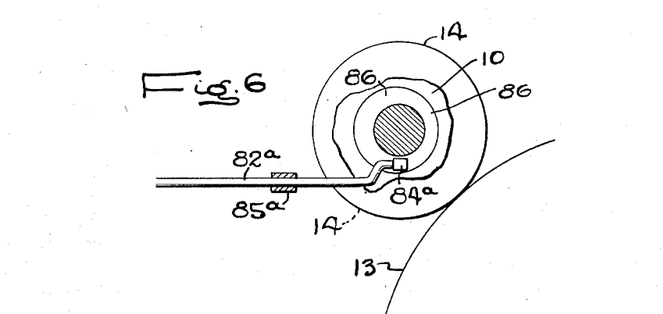
Fig. 6 is a fragmentary schematic view showing an actuator of alternate design which may be employed in place of that shown in Fig. 5.

The invention also contemplates actuating the push rod by retraction of the plate cylinder 14 when "lifting off impression" at the completion of a run. As illustrated more or less schematically in the fragmentary view of Fig. 6, a push rod 82a is engaged by a lug 84a which is mounted on an eccentric sleeve 86 associated with the plate cylinder 14. Rotation of the eccentric sleeve in a counterclockwise direction from the position shown is effective to move the plate cylinder bodily to the left away from the impression cylinder and to cause the push rod to move to the right shutting off the ink flow. The sequence of operation of the control shaft 49 and the associated parts upon either starting or stopping the press is the same as outlined in connection with the previous embodiment and the only difference resides in the specific means employed to move the push rod.

*Résumé of operation*

While the operation will in general be clear from the foregoing it may be summarized briefly as follows: As an incident to the starting up of the press the control shaft 49 in each of the inking devices 19–23 is caused to rotate in a direction which causes pressure on the clamping pins 46 to be released. Additional movement of the control shaft 49 causes the pawl 65 to drop from the masking plate 70 into engagement with the ratchet, and the fountain roller is indexed forwardly through an arc of sufficient width to supply the transfer roller 34 with a fresh ink film, this advancement being permitted by the overrunning clutch 74. Simultaneously, movement of the control shaft 49 causes the transfer roller 34 to advance into wiping engagement with the fountain roller 32. Although this arrangement has been found to prevent any possibility of leakage during standby, it enables a fresh ink film to proceed through the inking rollers when the printing operation commences.

Upon shutdown the opposite sequence occurs: The control shaft 49 is caused to rotate in a direction which causes disengagement of the transfer roller from the fountain roller. Further rotation results in advancement of the clamping pins 46 into maximum engagement with the fountain blade 39 shutting off the ink flow. Simultaneously, the pawl 65 is rotated clockwise into a position in which it rests on the masking plate 70 in readiness for a succeeding indexing cycle.

I claim as my invention:

1. In an ink feeding device, the combination comprising a relatively slowly rotating fountain roller, means including a fountain blade presenting its edge to said roller for forming an ink film thereon, a relatively faster rotating ink transfer roller normally in wiping engagement with said fountain roller, said blade and transfer roller being spaced from one another about the periphery of said fountain roller, indexing means for causing initial advancement of the fountain roller through an arc at least approximately equal to said peripheral spacing, clamping means for forcing said blade against said fountain roller, and means for sequentially releasing said clamping means and actuating said indexing means as an incident to starting up said press.

2. In an ink feeding device, the combination comprising a relatively slowly rotating fountain roller, means including a fountain blade presenting its edge to said roller for forming an ink film thereon, a relatively faster ink transfer roller relatively movable between a backed-off position spaced from said fountain roller and an ink transferring position in which said transfer roller is disposed in wiping relation with said fountain roller at a position spaced from said blade about the periphery of said fountain roller, indexing means for causing initial advancement of the fountain roller through an arc at least approximately equal to said peripheral spacing as an incident to putting the press into operation, and means for causing relative bodily advancement of said rollers into wiping engagement, in timed relationship to said advancement of the fountain roller.

3. In an ink feeding device, the combination of a relatively slowly rotating fountain roller, means including a fountain blade presenting its edge to said roller for forming an ink film thereon, a relatively faster rotating ink transfer roller peripherally spaced from said blade about said fountain roller and normally in wiping engagement with the latter, indexing means for causing advancement of the fountain roller and fresh film of ink thereon through an arc at least approximately equal to said peripheral spacing, clamping means for forcing said blade against said fountain roller, and means operated as an incident to the advancement of said carriage into working position for both releasing said clamping means and operating said fountain roller indexing means.

4. In an ink feeding device, the combination comprising a relatively slowly rotating fountain roller, means including a fountain blade presenting its edge to said fountain roller for forming an ink film thereon, a relatively faster rotating ink transfer roller movable bodily between a wiping position and a backed off position, an overrunning clutch for normal transmission of driving torque to said fountain roller, indexing means including a ratchet for overrunning said clutch and causing rotational advancement of the fountain roller, clamping means for forcing said blade against said fountain roller for cutting off the passage of ink, and control means for first releasing said clamping means, then actuating said indexing means for advancement of said fountain roller with a fresh film of ink thereon, and finally moving said transfer roller fully into the wiping position.

5. In an ink feeding device, the combination comprising a relatively slowly driven fountain roller, means including a fountain blade presenting its edge to said roller for forming an ink film thereon, a relatively faster driven ink transfer roller for wiping engagement with said fountain roller, said blade and transfer roller being peripherally spaced about the fountain roller, indexing means including a ratchet and pawl for causing initial advancement of the fountain roller through an arc at least approximately equal to said peripheral spacing, an overrunning clutch for permitting said ratchet and pawl to effect said initial advancement, clamping means for forcing said blade against said fountain roller to shut off the ink supply, a control shaft for both releasing said clamp and operating said fountain roller indexing means, and means for disabling said pawl and thus delaying said indexing until after said clamp has been at least partially released.

6. In an ink feeding device, the combination comprising an ink carriage, a plate cylinder having an eccentric for lifting off impression, and an inking arrangement, the latter including in combination, a relatively slowly rotating fountain roller, means including a fountain blade presenting its edge to said roller for forming an ink film thereon, clamping means enabling the clamping of said blade against said fountain roller for the prevention of leakage, a relatively faster rotating ink transfer roller peripherally spaced from said blade about said fountain roller and normally in wiping engagement therewith, indexing means for causing initial advancement of the fountain roller through an arc at least approximately equal to said peripheral spacing, and a force transmitting member actuated by said eccentric as an incident to putting on impression for both releasing said clamping means and operating said fountain roller indexing means thereby enabling immediate flow of a fresh film of ink.

7. In an ink feeding device, the combination comprising an ink trough, a fountain roller associated with said ink trough, a flexible fountain blade mounted in said trough and presenting its edge to said fountain roller, a series of reciprocable clamping pins having their tips axially abutting said blade at spaced intervals, a rotatable control shaft mounted parallel to said fountain roller and having a flattened cam surface thereon engaging the outer ends of said clamping pins for forcing them simultaneously against said blade upon rotation of the shaft, said ink trough being pivotally mounted about an axis which coincides with the axis of said control shaft so that upon bodily swinging of said ink trough and fountain blade away from said fountain roller for purposes of cleaning said pins ride from said cam surface onto the surface of said shaft and said shaft remains in its original position unmoved by shifting of said trough.

8. In an ink feeding device, the combination comprising a relatively slowly rotating fountain roller, a source of ink adjacent thereto, a fountain blade positioned below said ink source, a relatively faster rotating ink transfer roller for removing at least a portion of the ink film formed by said fountain blade, a series of threaded adjusting keys positioned at spaced points along said fountain blade for adjusting the same, a series of clamping pins interspersed between said adjusting keys and having their inner ends positioned to press against said blade, said clamping pins being entirely independent of the threaded adjusting keys, and a cam shaft abutting the outer ends of said clamping pins for camming them simultaneously into abutting engagement with said fountain blade for shutting off the ink flow during standby conditions.

9. In an ink feeding device, the combination comprising a relatively slowly rotating fountain roller, means including a fountain blade presenting its edge to said fountain roller for forming an ink film thereon, a relatively faster rotating ink transfer roller having means for mounting the same and movable between a wiping position and a backed-off position, clamping means for forcing said blade against said fountain roller for cutting off the passage of ink, means for re-releasing said clamping means as an incident to putting said press into operation, means for causing the fountain roller to be rotatively advanced to present a fresh film of ink to the transfer roller upon release of said clamping means, and means for causing timed lateral movement of the transfer roller into its wiping position relative to said fountain roller.

10. In an ink feeding device, the combination comprising a relatively slowly rotating fountain roller, means including a fountain blade presenting its edge to said fountain roller for forming an ink film thereon, a relatively faster rotating ink transfer roller having means for mounting the same and movable between a wiping position and a backed-off position, clamping means for forcing said blade against said fountain roller for cutting off the passage of ink, means for releasing said clamping means as an incident to putting said press to operation, means for causing the fountain roller to be rotatively advanced to present a fresh film of ink to the transfer roller, said advancing means including a ratchet and pawl having a lost motion device for insuring that the clamping means is released prior to advancement of the roller, and means for causing lateral movement of the transfer roller into its wiping position relative to said fountain roller, in timed relation with respect to advancement of the roller.

11. In an ink feeding device, the combination comprising a relatively slowly rotating fountain roller, means including a fountain blade presenting its edge to said fountain roller for forming an ink film thereon, a relatively faster rotating ink transfer roller relatively movable between a wiping position and a backed-off position, said transfer roller being peripherally spaced from said blade about the periphery of said fountain roller, clamping means for moving said blade between a film-forming position and a clamped position in which ink is effectively shut off, means for forcing said blade into its clamped position, and means for releasing said clamping means and then causing simultaneous forward indexing of said fountain roller and relative lateral advancement of said transfer roller, said indexing means having a lost motion connection therein so that a fresh film of ink is advanced from said blade to said transfer roller when the press is started up.

12. In an ink feeding device, the combination comprising a frame, an ink trough, a fountain roller associated with said ink trough, a flexible fountain blade mounted in said trough and presenting its edge to said fountain roller, adjusting keys threaded in said ink trough for regulating the ink film, a series of reciprocable clamping pins having their tips axially abutting said blade at spaced intervals, a rotatable control shaft mounted parallel to said fountain roller, a flat machined thereon for engaging the outer ends of said clamping pins to force the same against said blade upon rotation of the shaft, said ink trough having a trunnion on at least one of its ends journaled in said frame for outward swinging movement of the ink trough to enable the latter to be cleaned, said trunnion having a bore therein for receiving said control shaft and to permit driving connection to the latter.

13. An ink feeding device for a printing press, comprising, in combination, a rotatable ink supply roller, fountain means including a fountain blade disposed longitudinally along said roller for coating the latter with ink, a transfer roller arranged to have wiping engagement with said supply roller at a position spaced peripherally therealong from said blade, shifting means interconnected with said rollers for laterally separating said two rollers from each other upon stopping of the press; rotating means connected with said supply roller for effecting, as an incident to restarting the press, a quick angular advancement of the supply roller while said transfer roller is still separated therefrom; and said shifting means being interconnected with said advancing means to shift said rollers back into mutual wiping engagement approximately simultaneously with the completion of said quick supply roller advancement.

HENRY L. McWHORTER.

REFERENCES CITED

The following references are of record in the file of this patent:

UNITED STATES PATENTS

| Number | Name | Date |
| --- | --- | --- |
| 375,126 | Clark | Dec. 20, 1887 |
| 721,244 | Sherwood | Feb. 24, 1903 |
| 992,475 | Barber | May 16, 1911 |
| 1,900,263 | Wood | Mar. 7, 1933 |
| 2,170,025 | Jordhoy | Aug. 22, 1939 |
| 2,369,814 | Worthington | Feb. 20, 1945 |
| 2,377,663 | Barber | June 5, 1945 |

FOREIGN PATENTS

| Number | Country | Date |
| --- | --- | --- |
| 662,685 | Germany | July 19, 1938 |